United States Patent [19]

Creppel et al.

[11] Patent Number: 5,596,947
[45] Date of Patent: Jan. 28, 1997

[54] AQUACULTURE APPARATUS FOR USE ADJACENT AN OFFSHORE FIXED PLATFORM

[75] Inventors: Gregg G. Creppel, New Orleans; Charles C. Crochet, Lafayette, both of La.

[73] Assignee: The Watermark Corporation, New Orleans, La.

[21] Appl. No.: 298,723

[22] Filed: Aug. 31, 1994

[51] Int. Cl.⁶ .................................................. A01K 61/00
[52] U.S. Cl. ............................................................ 119/223
[58] Field of Search .................................. 119/208, 223, 119/215, 239, 240

[56] References Cited

U.S. PATENT DOCUMENTS

| | | | |
|---|---|---|---|
| 3,499,421 | 3/1970 | Macdonald et al. | 119/208 |
| 4,244,323 | 1/1981 | Morimura | 119/223 |
| 4,266,509 | 5/1981 | Gollott et al. | 119/208 |
| 4,337,727 | 7/1982 | Mickelsen et al. | 119/208 |
| 4,380,213 | 4/1983 | Blair et al. | 119/223 |
| 4,640,647 | 2/1987 | Blair et al. | |
| 4,710,061 | 12/1987 | Blair et al. | 405/195 |
| 4,716,854 | 1/1988 | Bourdon | 119/223 |
| 4,818,146 | 4/1989 | Fontenot | 405/212 |
| 4,972,801 | 11/1990 | Hunt . | |
| 4,982,697 | 1/1991 | Neff | 119/208 |

FOREIGN PATENT DOCUMENTS

| | | | |
|---|---|---|---|
| 80414 | 6/1983 | European Pat. Off. | 119/223 |
| 2627951A | 9/1989 | France | A01K 61/00 |
| 2639511 | 6/1990 | France | 119/223 |
| 1405747A | 6/1988 | U.S.S.R. | A01K 61/00 |
| 1576098 | 7/1990 | U.S.S.R. | 119/223 |

OTHER PUBLICATIONS

"Platforms Face Up To Typhoons", International file, *Fish Farmer* p. 7.
"Japan Sets New Targets", International File, *Fish Farmer,* Jan./Feb. 1992, pp. 4–5.
"Net Systems Introduces The *Ocean Spar*Net Pen System" Brochure.
The *Ocean Spar* Net Pen System summary sheet, 1 page.
"Open Ocean Fish Farming; Part One", *Aquaculture Magazine,* Sep./Oct. 1993, pp. 66–74.
"The Trident Cage System", *Aquaculture Magazine,* Nov./Dec. 1993, pp. 64 & 65.
"Off-shore Fish Farming May Feed The Hungry Bounty From The Gulf', 2 pages.
"Offshore Fish Farming: Reversing the 'Oceanic Dustbowl'", *Sea Technology,* Aug. 1993, pp. 21–26.
"Aquaculture Pens Extension Of Abandoned Platforms", *Offshore* (Advanced Technology), Aug. 1994, p. 20.
"Oil Rigs Convert to Fish Condominiums" by Sue Anne Pressley, Washington Post, Sep. 4, 1993, pp. A1, A11.
"Establishment of Artificial Reef Planning Areas and the Installation of an Artificial Reef and Processing Plant In the Gulf of Mexico", *Public Notice,* Dept. of the Army, N.O. District Corps of Engineers, Mar. 30, 1994.
"Fish Farming from Oil Rigs", *Profiles* (Continental Air Lines), Jan. 1995, p. 17.

*Primary Examiner*—Todd E. Manahan
*Attorney, Agent, or Firm*—Pravel, Hewitt, Kimball & Krieger

[57] ABSTRACT

An offshore aquaculture system for use with an oil or gas well production platform or like offshore structure is provided. The platform is preferably supported in four (4) directions by radially extending guy wires that attach to the upper end of the platform at one end of each wire and to the seabed at anchor piles at the other end of each wire. Anchor piles are driven into the seabed a substantial distance to provide anchorage for the undersea end of each guy wire. Fish pens are mounted to slide and travel on the diagonal guy wires and can be elevated or lowered relative to the seabed using ballast tanks attached to the fish pens and an endless winch line. The winch line is operated with a powered winch mounted on the platform deck. An opposed idler sheave is mounted at the seabed engaging the endless cable.

10 Claims, 2 Drawing Sheets

AQUACULTURE APPARATUS FOR USE ADJACENT AN OFFSHORE FIXED PLATFORM

BACKGROUND OF THE INVENTION

1. Field of the Invention

The field of the invention relates to aquaculture and mariculture systems and more particularly relates to an improved method and apparatus for raising and harvesting fish in an offshore environment wherein a relatively soft seabed of mud exists. The present invention further relates to an improved method and apparatus for raising fish adjacent an offshore platform wherein at least one and preferably a plurality of opposed diagonal support guy wires extend between the platform and an undersea anchor pile, wherein individual fish pens or cages can be quickly transported along the diagonal guy wires with a winch line (eg. an endless winch driven cable) aided by ballast tanks on the cages. Even more particularly, air and food are transmitted to the cages via flexible flow lines that travel with the cages as they move into selected undersea depths, such as to avoid storms and undesirable water quality zones.

2. General Background

In the Gulf of Mexico, excellent conditions exist for raising many species of saltwater fish in an aquaculture or mariculture environment. However, the Gulf of Mexico experiences drastic changes in both weather conditions and in water quality.

One of the common problems with water quality in the Gulf of Mexico is the presence of hypoxic (low dissolved oxygen) or "dead zones" that are not suitable for aquatic life. These hypoxic zones have been associated with the flow of water from various large rivers such as the Mississippi, the Atchafalaya River, and others. Temperature usually varies with water depth. Some species of saltwater fish need warmer water for example in winter months. Another problem that exists with fish farming or mariculture in the Gulf of Mexico is the existence of frequent thunderstorms that generate high winds and heavy seas. These thunderstorms can be an almost daily occurrence in the summer months. They occur with very little warning and can generate high winds and seas of 8–10 feet or more. Such seas are potentially destructive to any type of pen or cage that is used to contain fish as part of a mariculture operation.

If a fish pen or cage is of a substantial size, it requires substantial anchorage to support it in a desired position. This is another problem that plagues the concept of mariculture in the Gulf of Mexico. The seabed in the Gulf of Mexico is soft mud, and it is weak structurally. Therefore, the anchorage of substantial fish pens or cages is a problem considering the unconsolidated nature of the seabed.

Many mariculture and aquaculture systems have been patented wherein cages or pens are provided in a marine environment.

A lobster cage arrangement is seen in the MacDonald U.S. Pat. No. 3,499,421. The patent discloses the use of a plurality of piling driven into a seabed to support cages.

The Gollott U.S. Pat. No. 4,266,509 discloses an offshore habitat for shellfish. The apparatus includes an open framework enclosure and defines a plurality of laterally spaced side by side sets of vertically spaced elongated horizontal cavities open at one set of corresponding ends. At least one open top tray is slidingly removably received in each of the cavities through the open ends thereof and the upper portions of corresponding adjacent cavities of adjacent sets of cavities are horizontally communicated and the upper and lower portions of adjacent vertically spaced cavities are in direct communication with each other. The trays include foraminated bottom, side and end walls and the enclosure defines structure for preventing movement of the trays between corresponding laterally spaced cavities, outwardly of the remote sides of the endmost cavities and outwardly from the ends of the cavities remote from the open ends thereof. Further, structure is provided for releasably lockingly retaining the trays within the enclosure against removal from the open ends of the cavities and the trays are sufficiently closely vertically spaced to prevent natural shellfish predators from entering the trays.

A modular cage system for underwater use is disclosed in the Mickelsen U.S. Pat. No. 4,337,727. A vertical housing and feeding structure is provided for raising mariculture and other underwater animals. Tiers of feeding tubes, each of a successively longer length, form a backbone structure to which cages may be selectively connected. Each cage is connected along a vertical front face of the backbone structure so that one of the feeding tubes terminates at a point accessible from within the cage. A feed opening just above this termination point directs food material dropped through the feeding tube to either fall within the cage or be accessible from therewithin so that it may be consumed by the caged animal. All of the feeding tubes of each tier have a top open end that is positioned near the surface of the water to facilitate the controlled delivery of food to each individual cage. Two sets of backbone structure may be joined back-to-back so that cages may be connected to both sides of the structure, thereby doubling the cage capacity of the system. The capacity of the backbone structure may also be augmented by increasing the width of the tiers of feeding tubes or by adding additional tiers of feeding tubes to the back of each bone structure, each additional tier being of a successively longer length. Either method thus increases the frontal area of the backbone structure and provides additional frontal space to which additional cages may be attached. Inspection of the cages is facilitated by hoisting the entire backbone structure, including the cages attached thereto, out of the water. The walls of the cages are screened with a sufficiently large mesh to allow oxygenated water to freely circulate therethrough and to further allow fecal material and uneaten food to fall out of the cage without accumulation.

The Bourdon U.S. Pat. No. 4,716,854 provides an open sea aquaculture installation that comprises a central structure similar to an offshore drilling platform and several floating modules which are anchored to the seabed. The different modules are disposed at a distance, determined perpendicularly between lines each crossing a module and parallel to the mean direction of current in the surface layer of the sea, sufficient so that dejecta from the different modules do not interfere with adjacent modules.

An aquatic net pen and method is disclosed in U.S. Pat. No. 4,982,697. The pen has a light weight inexpensive net cover for the top which keeps predators out. The cover is easy to apply and remove and yet is held securely in place by means of studs or posts extending upwardly from the frame of the cage or pen and having enlarged heads which preferably are slightly larger than the holes in the mesh. Preferably the mesh is made up of resilient plastic strands which snap back into tier original shape after being deformed by the bolt-heads passing through, so that the bolt heads and the netting together form a snap-fitting fastening system. In one embodiment, panels of materials such plastic netting are suspended in cages so as to attract the growth of algae thereon for feeding algae-eating aquatic animals such as conch, fish, etc. in the cages. The panels are formed into a removable unit so that some of the units can be suspended in water elsewhere and transferred to the cage to replace units from which the algae has been depleted, thus feeding the aquatic animals by merely replacing algae-depleted units with algae-loaded units.

Various foreign patents have issued which relate to underwater farming of marine animals. A French Patent 2627-951-A concerns an underwater farm for the study of marine life. The farm consists of four (4) concrete blocks which are mounted on a metal frame that is anchored to the seabed. Each concrete block is formed with a large number of holes and recesses to provide shelter for small fishes from predators. The blocks also provide a base for the growth of marine vegetation. The blocks are connected to a research station on the shore by means of a pipe or umbilical cord, through which suitable food can be pumped to the blocks. An underwater television camera enables the marine animals to be observed from the shore station.

A Russian Patent SU 1405-747-A discloses a growing plant for sea organisms. The apparatus includes vertical supports arranged in two parallel rows and a supporting element with frame is located between the supports. The supporting element located between rows of supports carries a trust. Servicing of a fish crib is performed using two cranes with carriages. The system claims an advantage of easier maintaining of the plant with possible arrangement of larger numbers of fish cribs in the sea and simplified servicing.

It has been known in the art to convert oil rigs to fish habitat by toppling the rigs after they are abandoned. This concept was reported for example in the Washington Post Sep. 4, 1993 in an article entitled "Oil Rigs Convert to Fish Condominiums". The September, 1993 Washington Post article discloses that very large offshore oil platforms (for example 300 plus feet long) create an artificial reef for marine life when the oil production platform is turned on its side and sunk in the gulf of Mexico.

SUMMARY OF THE INVENTION

A method and apparatus for raising fish or other marine animals in an offshore environment provides a plurality of fish pens mounted on diagonally extending guy wires that attach to any offshore platform (for example an oil and gas drilling and/or production platform) and to piling driven into the seabed. The diagonally extending wires add additional support to the oil and gas well drilling platform (or like platform structure) while providing a diagonal path for transport of the fish pens between the water surface and the seabed.

The pens are very large structures (for example 100 feet long by 50 feet wide by 25 feet tall) that can contain large numbers of fish to be raised in the aquatic environment. However, the very large pens must be raised and lowered to avoid storms. Further, the enlarged pens are desirably positioned at a depth where water quality is highest.

In order to assist raising and lowering the fish pens, an enlarged endless winch line is provided having an idler sheave or sprocket at one end and a winch at the other. This configurations allows the fish pens to be transported up and down along a diagonal path. To aid in raising and lowering the pens ballast tanks are provided on the external surface of each of the pens.

A fluid flow line conveys fluid between the rig or platform and the fish pens. The flow line is preferably flexible such as for example polymeric or rubber hose. Feed, aeration, compressed air and the like can be pumped from a work area on the deck of the platform to the pens as needed. Because the flow lines are flexible, they easily travel with the pens as the pens move diagonally along the guy wires.

In the preferred embodiment, the guy wires are inclined.

BRIEF DESCRIPTION OF THE DRAWINGS

For a further understanding of the nature and objects of the present invention, reference should be had to the following detailed description, taken in conjunction with the accompanying drawings, in which like parts are given like reference numerals, and wherein.

DETAILED DESCRIPTION OF THE PREFERRED EMBODIMENT

Figure 1:
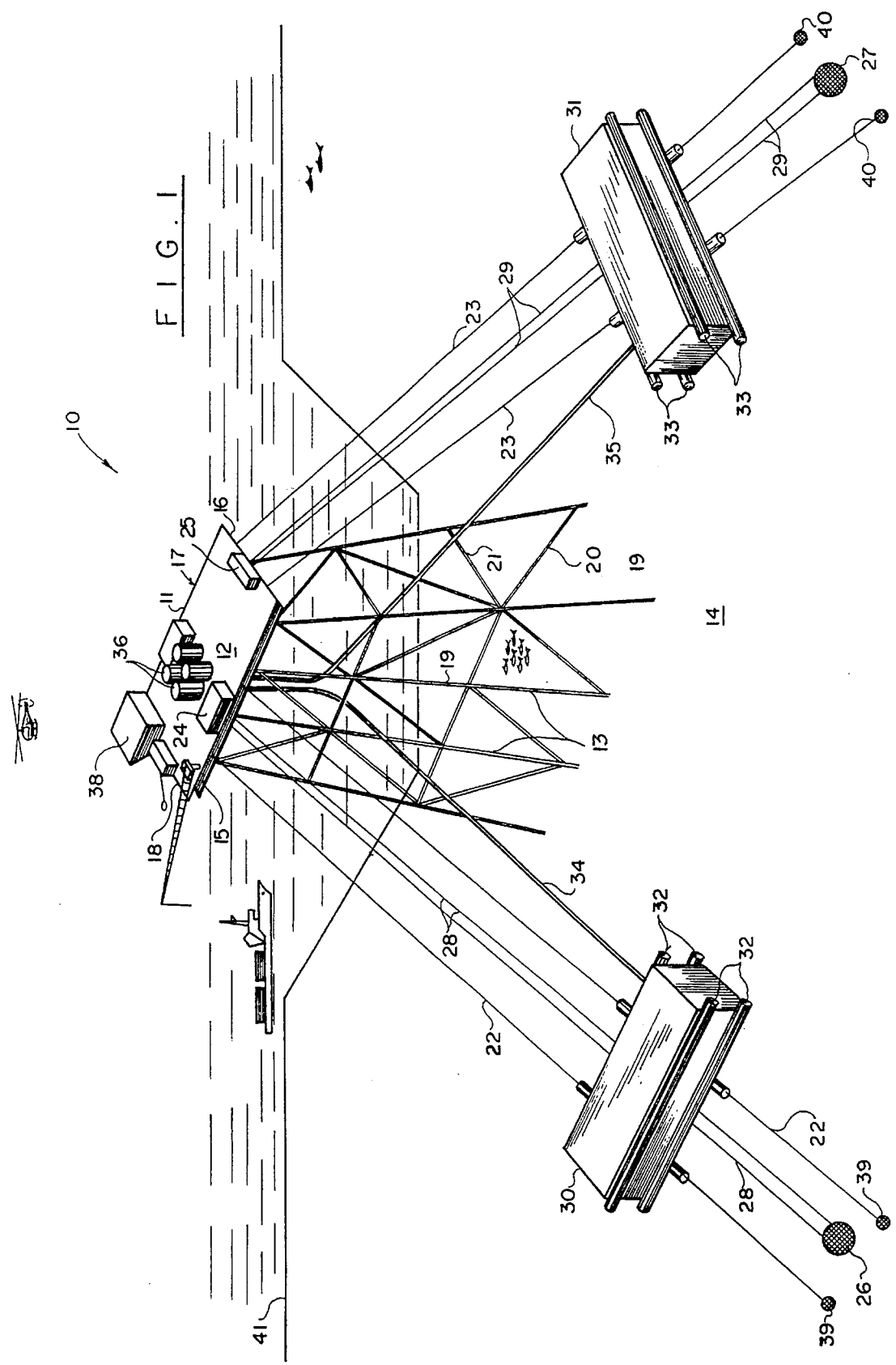
FIG. 1 is a perspective view of the preferred embodiment of the apparatus of the present invention.
Figure 2:
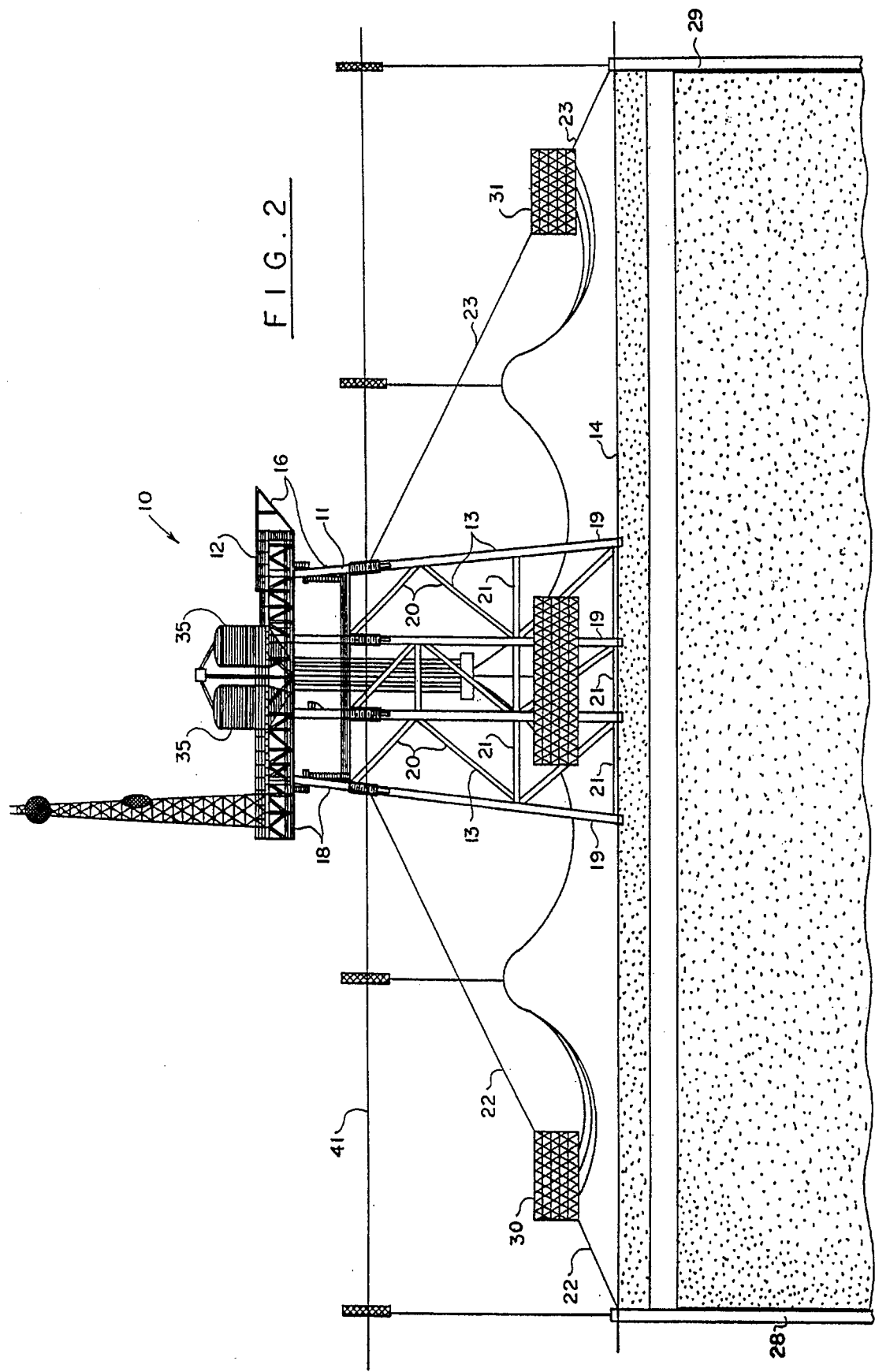
FIG. 2 is a perspective schematic view of the preferred embodiment of the apparatus of the present invention.

FIGS. 1 and 2 illustrate generally the preferred embodiment of the apparatus of the present invention designate generally by the numeral 10. Aquaculture apparatus 10 includes a platform 11 that provides an upper rectangular deck 12 supported upon a structural jacket 13. The jacket 13 can be anchored to the seabed 14 using piling for example in the manner in which offshore oil rig jackets are anchored to the seabed. Platform 11 can be an existing offshore oil and gas platform or one that has ceased production. Deck 12 includes four sides 15–18, each side having attached thereto diagonally extending guy wires 22, 23. For purposes of clarity, only two sets of guy wires 22, 23 are shown in the drawings. However, each side 15–18 of the platform deck 12 has guy wires 22, 23 (eg. wire rope) attached thereto so that four (4) sets of guy wires 22, 23 extend respectively from sides 15–18. Wires 22, 23 are used to support the platform 11 and for supporting fish pens as they move between shallower and deeper positions as will be described more fully hereinafter. Guy wires 22, 23 are anchored to the seabed using a plurality of anchor piles 39, 40. In this fashion, the anchor piles can be substantial structures extending far into the seabed to carry a part of the load generated by current wave and wind action and to carry a part of the load generated by the cages and guy wires.

The guy wires 22, 23, form an acute angle with the seabed 14. The angle of the guy wires 22, 23 with the seabed 14 may vary from 20 to 90 degrees, and will be determined by water depth, species cultivated, and operational activities undertaken, and in such a manner that the wind, wave, and current forces affecting the mass of the fish pens 30, 31 and guy wires 22, 23 will be distributed between the platform 11 and the anchor piles 39, 40.

Jacket 13 is preferably comprised of a single structural jacket of welded steel pipe for example including a plurality of vertical members 19, a plurality of diagonal members 20 and a plurality of horizontal members 21. Such jackets are common structural systems employed to support oil and gas well drilling and production in the Gulf of Mexico.

The guy wires 22, 23 extend from platform 11 at a position generally adjacent deck 12 and along a diagonal line that is preferably inclined by measure of less than 45° with the seabed. A preferable inclination of guy wires 22, 23 relative to the seabed is such that some of the guy wire load is transferred to the anchor piles. This allows the anchor pile to carry load generated by wave action, current, and wind as well as load associated with the mass of the cages and guy wires.

A plurality of fish pens or cages 30, 31 are supported respectively upon the guy wires 22, 23 using gusset plates, shackles or other conventional wire rope connectors. Each of the fish pens 30, 31 can be an expanded rectangular box-like structure that can be for example 100 ft. long, 50 ft. wide and 25 ft. tall. Cylindrical cages with rotational capability may be substituted for cages 30, 31. In order to move the fish pens 30, 31 between the water surface 41 and the seabed 14, a winch and winch cable arrangement (eg. wire rope) is provided as shown in FIG. 1. The winch and its cable can be simply a single winch line that extends from the platform 11 deck 12 to a cage 30, 31. Such winches are commonly used in anchor handling boats, on dredges, lay barges, derrick barges and the like. If a single winch and line are used, ballasting can be used to help raise and lower cages 30, 31. For each fish pen 30, 31 there is provided on deck 12, a winch house 24, 25 with commercially available wire rope equipped winches.

Each winch house can power an endless winch cable 28, 29 that is connected to the seabed by a sheave 26, 27 respectively. In this fashion, a winch in house 24, 25 can power the cables 28, 29 to raise or lower the fish pens 30, 31 relative to the seabed 14 and water surface 41. Such winch houses 24, 25, winch cables 28, 29, sheaves 26, 27 are commercially available.

Each of the fish pens 30, 31 provides a plurality of ballast tanks 32, 33 respectively. The ballast tanks 32, 33 aid in lowering or raising the fish pens 30, 31 as desired depending upon weather conditions and water quality. Each fish pen 30, 31 receives fluid communication from flexible flow lines 34, 35 respectively. Each flow line 34, 35 extends between a fish pen 30, 31 and the platform deck 12. The flow lines 34, 35 can be used to transmit compressed air for example to the ballast tanks 32, 33. Further, the flow lines 34, 35 can be used to transmit oxygenated water and/or food to the fish pens 30, 31 as desired. Therefore, the flow lines 34, 35 are preferably flexible such as for example being of polymeric or rubber hoses. Ballast tanks 32, 34 can be vented using valves when a lowering is desired toward the seabed.

The deck 12 of platform 11 carries a plurality of silos 36 for storing food that is to be pumped via line 34, 35 to fish pens 30, 31. Deck 12 of platform 11 also provides a compressor 37 for pumping food via flow lines 34, 35 to fish pens 30, 31.

The following table lists the parts numbers and parts descriptions as used herein and in the drawings attached hereto.

| PARTS LIST | |
|---|---|
| Part Number | Description |
| 10 | mariculture apparatus |
| 11 | platform |
| 12 | deck |
| 13 | jacket |
| 14 | seabed |
| 15 | side |
| 16 | side |
| 17 | side |
| 18 | side |
| 19 | vertical member |
| 20 | diagonal member |
| 21 | horizontal member |

| PARTS LIST -continued | |
|---|---|
| Part Number | Description |
| 22 | guy wire |
| 23 | guy wire |
| 24 | winch drive |
| 25 | winch drive |
| 26 | idler pulley |
| 27 | idler pulley |
| 28 | winch line |
| 29 | winch line |
| 30 | fish pen |
| 31 | fish pen |
| 32 | ballast tank |
| 33 | ballast tank |
| 34 | flow line |
| 35 | flow line |
| 36 | silo |
| 37 | compressor |
| 38 | pumps |
| 39 | anchor pile |
| 40 | anchor pile |
| 41 | water surface |

Because many varying and different embodiments may be made within the scope of the inventive concept herein taught, and because many modifications may be made in the embodiments herein detailed in accordance with the descriptive requirement of the law, it is to be understood that the details herein are to be interpreted as illustrative and not in a limiting sense.

What is claimed as invention is:

1. An aquaculture apparatus comprising:

a) a platform having a lower end that engages the seabed and an upper end that extends above the water surface;

b) a deck that provides a work surface at the upper end of the platform;

c) multiple guy wires extending from the platform upper end to the seabed along a diagonal path that forms an acute angle of between 20 and 90 degrees with the seabed;

d) anchor pile means for anchoring a first end of each of the guy wires to the seabed, a second end of each guy wire being anchored to the upper end of the platform;

e) at least one powered winch line extending between the platform and the seabed and generally tracking the guy wires;

f) at least one fish pen mounted respectively on the at least one winch line for travel to and from the platform on the at least one winch line and along the guy wires, the at least one winch line providing a means for raising and lowering the at least one fish pen;

g) ballast tank means on each fish pen for aiding in raising or lowering the fish pens relative to the seabed; and h) flexible conduit means communicating between the work surface and the at least one fish pen for supplying food, oxygenated water, and air for the ballast tank means.

2. The apparatus of claim 1 wherein there are multiple sets of guy wires including at least two opposed pairs, positioned on opposite sides of the platform.

3. The apparatus of claim 2 wherein there are four sets of guy wires radially extending from the platform and positioned at about ninety degrees relative to the next sets of guy wires.

4. The apparatus of claim 1 wherein there are multiple guy wires on each side of the platform.

5. The apparatus of claim 1 wherein there are at least two guy wires positioned, respectively, on opposite sides of each winch line.

6. The apparatus of claim 1 wherein the guy wires form an angle of about thirty degrees with the seabed.

7. The apparatus of claim 1 wherein the at least one winch line forms an angle of about thirty degrees with the seabed.

8. The apparatus of claim 1 wherein the ballast tank means comprises at least two ballast tanks mounted on opposite sides of each fish pen.

9. The apparatus of claim 1 wherein the guy wires and at least one winch line are generally parallel.

10. The apparatus of claim 1 wherein the flexible conduit means comprises flexible flow lines having end portions that travel with each fish pen.

* * * * *